United States Patent
Tsuchikura et al.

(10) Patent No.: US 9,719,197 B2
(45) Date of Patent: Aug. 1, 2017

(54) MULTI-LAYER TUBULAR WOVEN CONSTRUCT

(71) Applicant: Toray Industries, Inc., Tokyo (JP)

(72) Inventors: Hiroshi Tsuchikura, Otsu (JP); Satoshi Yamada, Otsu (JP); Masaki Fujita, Otsu (JP); Atsushi Kuwabara, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/100,057

(22) PCT Filed: Nov. 27, 2014

(86) PCT No.: PCT/JP2014/081378
§ 371 (c)(1),
(2) Date: May 27, 2016

(87) PCT Pub. No.: WO2015/080201
PCT Pub. Date: Jun. 4, 2015

(65) Prior Publication Data
US 2017/0002484 A1    Jan. 5, 2017

(30) Foreign Application Priority Data

Nov. 29, 2013    (JP) .................................. 2013-248575

(51) Int. Cl.
| | | |
|---|---|---|
| D03D 3/02 | (2006.01) | |
| B32B 1/08 | (2006.01) | |
| B32B 5/02 | (2006.01) | |
| B32B 5/26 | (2006.01) | |
| D03D 13/00 | (2006.01) | |

(52) U.S. Cl.
CPC ............ *D03D 3/02* (2013.01); *B32B 1/08* (2013.01); *B32B 5/024* (2013.01); *B32B 5/26* (2013.01); *B32B 2250/20* (2013.01); *B32B 2262/0276* (2013.01); *B32B 2307/546* (2013.01); *B32B 2597/00* (2013.01)

(58) Field of Classification Search
CPC ...... D03D 3/02; D03D 1/0035; D03D 13/002; D03D 11/00; D03D 11/02; D03D 13/00; D03D 1/00; D03D 25/005
See application file for complete search history.

(56) References Cited

U.S. PATENT DOCUMENTS

| | | | | |
|---|---|---|---|---|
| 5,413,149 A * | 5/1995 | Ford | ........................ | D03D 3/02 |
| | | | | 138/103 |
| 5,556,495 A * | 9/1996 | Ford | ........................ | D03D 3/02 |
| | | | | 139/DIG. 1 |
| 5,613,522 A * | 3/1997 | Ford | ........................ | D03D 3/02 |
| | | | | 138/103 |
| 7,550,006 B2 * | 6/2009 | Nunez | ........................ | A61F 2/06 |
| | | | | 623/1.51 |
| 9,347,158 B2 * | 5/2016 | Cabouillet | ............... | D04H 1/52 |
| 2005/0131516 A1 * | 6/2005 | Greenhalgh | ............... | A61F 2/07 |
| | | | | 623/1.13 |
| 2005/0217748 A1 * | 10/2005 | Ikegami | ................. | A62B 35/04 |
| | | | | 139/388 |
| 2008/0254244 A1 * | 10/2008 | Yamaguchi | .............. | F16L 57/06 |
| | | | | 428/36.1 |
| 2013/0243985 A1 * | 9/2013 | Furuta | .................... | D03D 3/005 |
| | | | | 428/36.1 |
| 2014/0220846 A1 * | 8/2014 | Woodruff | ............... | H02G 15/18 |
| | | | | 442/208 |
| 2014/0272224 A1 * | 9/2014 | Cabouillet | ............... | D04H 1/52 |
| | | | | 428/36.1 |
| 2017/0036412 A1 * | 2/2017 | Malloy | ................ | D03D 1/0035 |

FOREIGN PATENT DOCUMENTS

| | | |
|---|---|---|
| JP | 63-196889 | 12/1988 |
| JP | 63-196889 U | 12/1988 |
| JP | 01-113685 | 7/1989 |
| JP | 1-113685 U | 7/1989 |
| JP | 04-074788 | 6/1992 |
| JP | 4-74788 U | 6/1992 |
| JP | 2718571 B2 | 11/1997 |
| JP | 10-061837 A | 3/1998 |
| JP | 2000-139967 A | 5/2000 |
| JP | 2009-270236 A | 11/2009 |

OTHER PUBLICATIONS

International Preliminary Report dated May 31, 2016, of corresponding PCT/IP2014/081378 in English.

* cited by examiner

*Primary Examiner* — Bobby Muromoto, Jr.
(74) *Attorney, Agent, or Firm* — DLA Piper LLP (US)

(57) ABSTRACT

A multi-layer tubular woven construct includes two or more layers including an innermost layer and layer A that is a layer other than the innermost layer, layer A including a monofilament yarn serving as a weft yarn, the weft yarn extending spirally and circumferentially around the tubular woven construct to form the weft, the weft including threads lying adjacent to each other, the adjacent weft threads of the monofilament yarn having intervals larger than the diameter of the monofilament yarn.

10 Claims, No Drawings

MULTI-LAYER TUBULAR WOVEN CONSTRUCT

TECHNICAL FIELD

This disclosure relates to a multi-layer tubular woven construct. In particular, the disclosure relates to a multi-layer tubular woven construct useful as a hose for transportation of a fluid or a powder or as a hose for protection of linear bodies such as wires, cables and conduits.

BACKGROUND

Tubular fiber constructs are used for various industrial applications such as hoses, reinforcements, and protective materials. Depending on the usage, tubular fiber constructs are bent, wound in a spiral shape, or disposed in a meandering manner to fit a space. Accordingly, to prevent crushing or twisting of the tubular fiber constructs in various usages, a high kink resistance (flexibility) is imparted to tubular fiber constructs, and various methods of improving the property have been proposed.

Various types of such tubular constructs are proposed, including, for example, a fabric sleeve to bundle and protect elongated articles such as wires, cables, hoses and conduits, the sleeve comprised of warp and fill ends having an open construction, the sleeve having a substantially circular cross-sectional configuration, the sleeve comprising: at least one resilient filamentary fill end having a resilient set in a hoop configuration disposed in a plane extending substantially perpendicularly to the sleeve central axis; and at least one resilient filamentary warp end interwoven with the fill end, the warp end having a resilient set in a spiral configuration and having a pitch of from about 0.2 to about 0.3 turns per longitudinal sleeve inch (25.4 mm), the sleeve being discontinuous in the circumferential direction (JP Patent No. 2718571). Another proposed tubular construct is a vascular prosthesis comprising a 50 to 2000 dtex composite monofilament yarn melt-bonded to the outer circumference of the vascular prosthesis, the composite monofilament yarn comprising a high melting point component made of a thermoplastic polymer and a low melting point component made of a thermoplastic polymer having a lower melting point than the high melting point component (JP 2000-139967 A).

The tubular fabric sleeve of JP '571 is discontinuous in the circumferential direction and thus has a small gap or opening extending in the longitudinal direction along the discontinuous part. The small gap or opening may cause the leakage of a fluid or a powder during its transportation or may allow the penetration of linear bodies such as wires, cables, hoses and conduits. The literature also describes a configuration in which the edges of the longitudinal slit are overlapped to close the opening. The overlapped part forms a raised seam on the inner surface. The raised part may affect feed pressure for transporting a fluid or a powder. In addition, linear bodies such as wires, cables, hoses and conduits may be caught by the uneven inner surface.

The vascular prosthesis of JP '967 has, as described above, a configuration in which a 50 to 2000 dtex composite monofilament yarn comprising a high melting point component made of a thermoplastic polymer and a low melting point component made of a thermoplastic polymer having a lower melting point than the high melting point component is melt-bonded to the outer circumference of the vascular prosthesis. However, the melt-bonded yarn may peel off and thus the vascular prosthesis has low reliability. In addition, disadvantageously, a melt-bonding process is additionally required.

It could therefore be helpful to provide a multi-layer tubular woven construct that allows the transportation of a fluid or a powder without causing any problems and is suitable as a hose for protection of linear bodies such as wires, cables, hoses and conduits.

SUMMARY

We thus provide:

(1) A multi-layer tubular woven construct comprising two or more layers comprising an innermost layer and layer A that is a layer other than the innermost layer, layer A comprising a monofilament yarn serving as a weft yarn, the weft yarn extending spirally and circumferentially around the tubular woven construct to form the weft, the weft comprising threads lying adjacent to each other, the adjacent weft threads of the monofilament yarn having intervals larger than the diameter of the monofilament yarn.

(2) The multi-layer tubular woven construct of the above (1), comprising layer B that is an inner layer relative to layer A, layer B comprising a multifilament yarn as a weft yarn.

(3) The multi-layer tubular woven construct of the above (1), comprising two layers comprising an inner layer formed of a multifilament yarn.

(4) The multi-layer tubular woven construct of the above (2) or (3), wherein the multifilament yarn comprises monofilaments with a diameter of 6 µm or less.

(5) The multi-layer tubular woven construct of the above (2), which satisfies the formula: $Df \geq 3Dm$, wherein $Dm$ is the weft density of layer A and $Df$ is the weft density of layer B.

(6) The multi-layer tubular woven construct of any of the above (1) to (4), which satisfies the formula: $Rm > Rh/300$, wherein $Rh$ is the outer diameter of the multi-layer tubular woven construct and $Rm$ is the diameter of the cross section of the monofilament yarn.

The multi-layer tubular woven construct with the above structure exhibits the effects as described later and has a high kink resistance. Therefore the multi-layer tubular woven construct allows transportation of a fluid or a powder without causing any problems and is suitable as a hose for protection of linear bodies such as wires, cables, hoses and conduits.

The multi-layer tubular woven construct comprises layer A, which is a layer other than the innermost layer. Layer A comprises a monofilament yarn serving as a weft yarn, the weft yarn extends spirally and circumferentially around the tubular woven construct to form the weft. The weft comprises threads lying adjacent to each other and the adjacent weft threads of the monofilament yarn have intervals larger than the diameter of the monofilament yarn. Usually, a monofilament yarn is thicker than a multifilament yarn at the same fineness. Hence, the multi-layer tubular woven construct provided with the above configuration, in which threads of the stiff monofilament yarn are appropriately laid adjacent to each other so that the interval between the adjacent threads of the monofilament yarn is larger than the diameter of the monofilament yarn, has a high shape-retaining property. When such a tubular woven construct is subjected to bending, the adjacent threads of the monofilament yarn are not in excessive contact with each other. Therefore, the tubular woven construct has a high kink resistance. The multi-layer tubular woven construct is produced by interlacing the weft into the warp with a predetermined weave pattern in a manner that the weft yarn extends spirally and circumferentially around the tubular woven construct. The warp and the weft are firmly interlocked and they resist being pulled apart. Therefore the multi-layer tubular woven construct allows the transportation of a fluid or a powder without causing any problems and is suitable as a hose for protection of linear bodies such as wires, cables, hoses and conduits. In the spiral and circumferential configuration of the weft yarn, if the interval between the adjacent weft threads of the monofilament yarn is too large compared with the diameter of the monofilament yarn, the multi-layer tubular woven construct is susceptible to crushing. The angle between the direction of the weft yarn extending spirally and circumferentially around the tubular woven construct and the longitudinal direction of the tubular woven construct is preferably 45° or more.

In the multi-layer tubular woven construct, a monofilament yarn is contained in the weft of the outer layer and a multifilament yarn is contained at least in the weft of an inner layer. This configuration is advantageous because the outer layer comprising the stiff monofilament yarn in the weft contributes to a high kink resistance, and the inner layer comprising the fine multifilament yarn at least in the weft has a dense structure. The multi-layer tubular woven construct with this configuration is suitable as a hose for transportation of a fluid or a powder or as a hose for protection of linear bodies.

In the multi-layer tubular woven construct, the multifilament yarn forming the inner layer comprises monofilaments with a diameter of 6 µm or less. This configuration is advantageous because the multi-layer tubular woven construct comprising the multifilament yarn of the finer filaments in the inner layer has a high flexibility and a dense structure. In this regard, the diameter of the monofilaments in the multifilament yarn in the inner layer is preferably 5 µm or less.

The multi-layer tubular woven construct satisfies the formula: $Df \geq 3Dm$, wherein $Dm$ is the weft density of outer layer A and $Df$ is the weft density of inner layer B. This configuration is advantageous because the inner layer has a dense structure and the outer layer containing threads of the monofilament yarn lying at appropriate intervals contributes to a high kink resistance of the tubular woven construct. Therefore the multi-layer tubular woven construct with this configuration is suitable as a hose for transportation of a fluid or a powder or as a hose for protection of linear bodies.

The multi-layer tubular woven construct satisfies the formula: $Rm > Rh/300$, wherein $Rh$ is the outer diameter of the multi-layer tubular woven construct and $Rm$ is the diameter of the cross section of the monofilament yarn. In the tubular woven construct satisfying this formula, the monofilament yarn has an appropriate diameter according to the outer diameter of the tubular woven construct. With this configuration, the tubular woven construct can have high kink resistance without substantial limitation on the size of the outer diameter. Therefore, the multi-layer tubular woven construct with this configuration is suitable as a hose for transportation of a fluid or a powder or as a hose for protection of linear bodies. More preferably, the tubular woven construct satisfies the formula: $Rm > Rh/50$. A too large diameter of the cross section of the monofilament yarn will result in difficulty in bending the multi-layer tubular woven construct. Therefore the diameter of the cross section $Rm$ of the monofilament yarn preferably satisfies the formula: $Rm \leq Rh/10$.

DETAILED DESCRIPTION

The multi-layer tubular woven construct comprises a monofilament yarn in the weft of a layer other than the innermost layer. As the monofilament yarn, various types of synthetic fibers such as nylon fibers and polyester fibers, may be used. Polyester fibers are preferred to achieve a high strength and a high dimensional stability. Examples of the polyester fibers include polyethylene terephthalate fibers, polybutylene terephthalate fibers and the like. The polyester fibers may be copolymerized polyester fibers produced by copolymerizing polyethylene terephthalate or polybutylene terephthalate with an acid component, for example, isophthalic acid, sodium 5-sulfoisophthalate, or an aliphatic dicarboxylic acid such as adipic acid.

The thickness (the diameter of the cross section) of the monofilament yarn may be freely designed depending on the purpose of use, but in terms of achieving a high kink resistance, the thickness of the monofilament yarn preferably satisfies the formula: $Rm > Rh/300$, wherein $Rh$ is the outer diameter of the multi-layer tubular woven construct and $Rm$ is the diameter of the cross section of the monofilament yarn. This configuration is advantageous because, by using this formula at the time of designing the multi-layer tubular woven construct, the monofilament yarn diameter suitable to achieve a high kink resistance is appropriately selected in accordance with the outer diameter of the tubular woven construct. As a result, the multi-layer tubular woven construct can be designed without substantial limitation on the size of the outer diameter of the tubular woven construct. In this manner, the multi-layer tubular woven construct suitable as a hose for transportation of a fluid or a powder or as a hose for protection of linear bodies can be obtained. In this regard, the tubular woven construct more preferably satisfies the formula: $Rm > Rh/50$.

The multi-layer tubular woven construct comprises layer A, which is a layer other than the innermost layer. Layer A comprises a monofilament yarn serving as a weft yarn and the weft yarn extends spirally and circumferentially around the tubular woven construct. This configuration is advantageous because usually a monofilament yarn is thicker than a multifilament yarn at the same fineness and thus the stiff monofilament yarn used herein imparts a high shape-retaining property and a high kink resistance to the multi-layer tubular woven construct. In the multi-layer tubular woven construct, threads of the stiff monofilament yarn forming the weft are laid at appropriate intervals so that the interval between the adjacent threads of the monofilament yarn is larger than the diameter of the monofilament yarn. This configuration is advantageous because when the tubular woven construct is subjected to bending, the adjacent threads of the monofilament yarn are not in excessive contact with each other, and thus the tubular woven construct achieves a high kink resistance.

The multi-layer tubular woven construct comprises a multifilament yarn in the weft and/or the warp of the inner layer. As the multifilament yarn, various types of synthetic fibers such as nylon fibers and polyester fibers, may be used. Polyester fibers are preferred to achieve a high strength and a high dimensional stability. Examples of the polyester fibers include polyethylene terephthalate fibers, polybutylene terephthalate fibers and the like. The polyester fibers may be copolymerized polyester fibers produced by copolymerizing polyethylene terephthalate or polybutylene terephthalate with an acid component, for example, isophthalic acid, sodium 5-sulfoisophthalate, or an aliphatic dicarboxylic acid such as adipic acid. The fibers contained in the multifilament yarn may be a single type or an appropriate combination of different types of fibers. The multifilament yarn may be freely designed depending on the purpose of use, but the diameter of the monofilaments contained in the multifilament yarn is preferably 6 μm or less to achieve a high flexibility and a dense structure of the multi-layer tubular woven construct. In this regard, the diameter of the monofilaments in the multifilament yarn in the inner layer is preferably 5 μm or less.

The permeation rate of a powder dispersion through the multi-layer tubular woven construct is preferably 5.0 mL/(min·cm²·120 mmHg (16 kPa)) or less. The tubular woven construct with this permeation rate will have no leakage of a powder or a fluid during its transportation, and linear bodies such as wires, cables, hoses and conduits will not be caught in the space between the fibers. The permeation rate of a powder dispersion is more preferably 2.0 mL/(min·cm²·120 mmHg (16 kPa)) or less, and is further preferably 1.0 mL/(min·cm²·120 mmHg (16 kPa)) or less. The permeation rate of a powder dispersion is expressed by the amount of a powder dispersion that permeates through the space between the fibers of a fabric of 1 cm² in size for 1 minute when a pressure of 120 mmHg (16 kPa) is applied to the powder dispersion. If the permeation rate of a powder dispersion exceeds 5.0 mL/(min·cm²·120 mmHg (16 kPa)), a powder or a fluid will easily leak through the tubular woven construct during the transportation, and linear bodies such as wires, cables, hoses and conduits, will be easily caught in the space between the fibers.

The above permeation rate of a powder dispersion can be achieved by adjusting the percentage of the multifilament yarn contained in each layer of the multi-layer tubular woven construct, or by adjusting the weaving density of the multifilament yarn. That is, the permeation rate of a powder dispersion through the multi-layer tubular woven construct mainly depends on the amount of the space between the monofilaments in the multifilament yarn. Therefore, by adjusting the percentage of the multifilament yarn contained in each layer or adjusting the weaving density of the multifilament yarn, the space between the monofilaments in the multifilament yarn can be controlled and, in this manner, the multi-layer tubular woven construct with a desired permeation rate of a powder dispersion can be obtained.

The multi-layer tubular woven construct comprises at least two layers, but the structure of the tubular woven construct is not limited to a two-layer structure. The multi-layer tubular woven construct may comprise three layers or more depending on the purpose of use or the application thereof.

The loom to be used to weave the multi-layer tubular woven construct may be, for example, a rapier loom, a shuttle loom or the like. Of these, preferred is a shuttle loom, which is excellent in weaving a tubular fabric and can give a uniform tubular structure.

The multi-layer tubular woven construct comprises two layers or more of weave. The weave pattern may be plain weave, twill weave or sateen weave, or modified weave thereof, or multi-layer weave. The layers may have the same weave pattern or have different weave patterns in an appropriate combination.

The weave density of the multi-layer tubular woven construct may be appropriately designed depending on the purpose of use. The tubular woven construct preferably satisfies the formula: Df≥3Dm (wherein Dm is the weft density of the outer layer and Df is the weft density of the inner layer). In such a tubular woven construct, the inner layer has a dense structure and the outer layer containing threads of the monofilament yarn lying at appropriate intervals contributes to a high kink resistance of the tubular woven construct. Therefore the multi-layer tubular woven construct is preferably satisfies the above formula.

EXAMPLES

Our constructs will be specifically described with reference to Examples, but this disclosure is not limited thereto. Various alterations and modifications are possible within the technical scope of the disclosure. The various types of the properties evaluated in the Examples were measured as follows.

Measurement Methods (1) Fineness

Total Fineness

The total fineness of a yarn was determined as a mass-corrected fineness in accordance with method A in JIS L 1013 (1999) 8.3.1, by setting the predetermined load at 0.045 cN/dtex.

Monofilament Fineness

The monofilament fineness was determined by dividing the total fineness by the number of monofilaments.

(2) Weave Density

A produced multi-layer tubular woven construct was cut open in the longitudinal direction. The inner wall surface was photographed at 50-fold magnification with a microscope VHX-2000 (KEYENCE CORPORATION). The number of fibers in a certain length was counted and converted into the number of fibers per 2.54 cm (1 inch). The value was taken as the weave density of the innermost layer. The weave densities of the other layers were determined from the ratios of the warp and weft threads relative to those in the innermost layer at the time of designing the weave patterns of the layers.

(3) Diameter of Monofilaments

The surface of the monofilament yarn to be used and/or the monofilaments contained in the multifilament yarn to be used was photographed at 400-fold magnification with a microscope VHX-2000 (KEYENCE CORPORATION). The width of the monofilament on the photograph was measured. The value for the monofilament yarn was expressed in terms of millimeters and the value for the multifilament yarn was expressed in terms of micrometers. In a modified cross-section yarn such as a flat yarn, the diameter was determined by measuring the minimum width of the surface.

(4) Interval Between Adjacent Threads of Monofilament Yarn

The interval between the adjacent threads of the monofilament yarn was calculated from the weave density Dm (the number of monofilaments per 25.4 mm determined as above) and the diameter M (mm) of the monofilament yarn by the following formula:

Interval between adjacent threads of monofilament yarn=[25.4/number of monofilaments−M](mm).

(5) Permeation Rate of Powder Dispersion

In water as sufficiently clean as tap water, 55 vol % of a powder with a particle diameter of 3 to 15 μm was substantially uniformly dispersed. The powder dispersion was fed to a multi-layer tubular woven construct for 20 minutes under the condition that the hydraulic pressure applied to the inner wall was 120 mmHg (16 kPa) to permeate through the woven construct. After that, the amount of the dispersion that permeated through the wall of the multi-layer tubular woven construct per minute was measured. The amount of the dispersion was divided by the surface area (cm²) of the multi-layer tubular woven construct and the obtained value was taken as the permeation rate of the powder dispersion.

(6) Kink Resistance

Kink resistance was evaluated in terms of the kink radius in accordance with the guidance of ISO 7198. Briefly, a multi-layer tubular woven construct was formed into a loop, and the radius of the loop was gradually decreased until apparent kinking occurred. A cylindrical mandrel with a known radius was placed in the loop to measure the radius (kink radius). In the test, internal pressure was not applied for the purpose of the evaluation of the genuine kink resistance of the multi-layer tubular woven construct.

Example 1

A polyester monofilament yarn with a monofilament fineness of 108 dtex (0.11 mm in diameter) and a polyester multifilament yarn with a monofilament fineness of 2.33 dtex and a total fineness of 56 dtex were prepared as fibers for forming outer layer A of a multi-layer tubular woven construct. The multifilament yarn was used as a warp yarn and the monofilament yarn was used as a weft yarn in the weaving process described later.

A polyester multifilament yarn with a monofilament fineness of 0.23 dtex (4.7 µm in diameter) and a total fineness of 33 dtex was prepared as fibers for forming inner layer B. This multifilament yarn was used as warp and weft yarns in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric heat-set at 170° C. into that shape. Thus, a multi-layer tubular woven construct containing outer layer A with a weft density of 76 picks per 2.54 cm and inner layer B with a weft density of 230 picks per 2.54 cm was obtained.

The multi-layer tubular woven construct was subjected to an evaluation of the permeation rate of the powder dispersion and kink resistance. The results are shown in Table 1. The permeation rate of the powder dispersion was 0.30 mL/(min·cm²·120 mmHg (16 kPa)). The kink resistance value was 12 mm. The multi-layer tubular woven construct had very excellent properties and was found to be suitable as a hose for transportation of a fluid or a powder or as a hose for protection of linear bodies. In actual use, a fluid or a powder will not leak during its transportation, and linear bodies such as a wire will not be caught by the inner layer surface.

Example 2

A polyester monofilament yarn with a monofilament fineness of 333 dtex (0.18 mm in diameter) and a polyester multifilament yarn with a monofilament fineness of 2.33 dtex and a total fineness of 56 dtex were prepared as fibers to form outer layer A of a multi-layer tubular woven construct. The multifilament yarn was used as a warp yarn and the monofilament yarn was used as a weft yarn in the weaving process described later.

A polyester multifilament yarn with a monofilament fineness of 0.23 dtex (4.7 µm in diameter) and a total fineness of 33 dtex was prepared as fibers to form inner layer B. This multifilament yarn was used as warp and weft yarns in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric was heat-set at 170° C. into that shape. Thus, a multi-layer tubular woven construct containing outer layer A with a weft density of 46 picks per 2.54 cm and inner layer B with a weft density of 230 picks per 2.54 cm was obtained.

The multi-layer tubular woven construct was subjected to evaluation of the permeation rate of the powder dispersion and kink resistance. The results are shown in Table 1. The permeation rate of the powder dispersion was 4.80 mL/(min·cm²·120 mmHg (16 kPa)). The kink resistance value was 10 mm. These results were better than those in Example 1. The multi-layer tubular woven construct had excellent properties and was found to be suitable as a hose for transportation of a fluid or a powder or as a hose for protection of linear bodies. In actual use, a fluid or a powder will not substantially leak during its transportation, and linear bodies such as a wire will not be caught by the inner layer surface.

Example 3

A polyester monofilament yarn with a monofilament fineness of 180 dtex (0.13 mm in diameter) and a polyester multifilament yarn with a monofilament fineness of 2.33 dtex and a total fineness of 56 dtex were prepared as fibers to form outer layer A of a multi-layer tubular woven construct. The multifilament yarn was used as a warp yarn and the monofilament yarn was used as a weft yarn in the weaving process described later.

A polyester multifilament yarn with a monofilament fineness of 0.33 dtex (5.6 µm in diameter) and a total fineness of 48 dtex was prepared as fibers to form inner layer B. This multifilament yarn was used as warp and weft yarns in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric was heat-set at 170° C. into that shape. Thus, a multi-layer tubular woven construct containing outer layer A with a weft density of 17 picks per 2.54 cm and inner layer B with a weft density of 306 picks per 2.54 cm was obtained.

The multi-layer tubular woven construct was subjected to an evaluation of the permeation rate of the powder dispersion and kink resistance. The results are shown in Table 1. The permeation rate of the powder dispersion was 0.15 mL/(min·cm²·120 mmHg (16 kPa)). The kink resistance value was 15 mm. The multi-layer tubular woven construct had very excellent properties and was found to be suitable as a hose for transportation of a fluid or a powder or as a hose for protection of linear bodies. In actual use, a fluid or a powder will not leak during its transportation, and linear bodies such as a wire will not be caught by the inner layer surface.

Example 4

A polyester monofilament yarn with a monofilament fineness of 105 dtex (0.10 mm in diameter) and a polyester multifilament yarn with a monofilament fineness of 2.33 dtex and a total fineness of 56 dtex were prepared as fibers for forming outer layer A of a multi-layer tubular woven construct. The multifilament yarn was used as a warp yarn and the monofilament yarn was used as a weft yarn in the weaving process described later.

A polyester multifilament yarn with a monofilament fineness of 0.23 dtex (4.7 μm in diameter) and a total fineness of 33 dtex was prepared as fibers to form inner layer B. This multifilament yarn was used as warp and weft yarns in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric was heat-set at 170° C. into that shape. Thus, a multi-layer tubular woven construct containing outer layer A with a weft density of 21 picks per 2.54 cm and inner layer B with a weft density of 336 picks per 2.54 cm was obtained.

The multi-layer tubular woven construct was subjected to an evaluation of the permeation rate of the powder dispersion and kink resistance. The results are shown in Table 1. The permeation rate of the powder dispersion was 0.15 mL/(min·cm$^2$·120 mmHg (16 kPa)). The kink resistance value was 22 mm. The multi-layer tubular woven construct had very excellent properties and was found to be suitable as a hose for transportation of a fluid or a powder or as a hose for protection of linear bodies. In actual use, a fluid or a powder will not leak during its transportation, and linear bodies such as a wire will not be caught by the inner layer surface.

Example 5

A polyester monofilament yarn with a monofilament fineness of 180 dtex (0.13 mm in diameter) and a polyester multifilament yarn with a monofilament fineness of 2.33 dtex and a total fineness of 56 dtex were prepared as fibers to form outer layer A of a multi-layer tubular woven construct. The multifilament yarn was used as a warp yarn and the monofilament yarn was used as a weft yarn in the weaving process described later.

A polyester sea-island type multifilament yarn A' with a monofilament fineness of 7.3 dtex and a total fineness of 66 dtex (sea/islands (mass ratio)=20/80, the number of islands: 70) was used as fibers for forming inner layer B. The sea component polymer was polyethylene terephthalate copolymerized with sodium 5-sulfoisophthalate, and the island component polymer was polyethylene terephthalate. This multifilament yarn A' was made into an ultra-fine multifilament yarn A in a later process. The multifilament yarn A' was used as warp and weft yarns in the weaving process described below.

A multi-layer tubular woven fabric of 6 mm in outer diameter was woven with a shuttle loom using the above yarns. The tubular fabric was scoured at 98° C. The sea component of the sea-island composite fibers was completely removed by dissolving the sea component in 4% by mass aqueous sodium hydroxide solution at 98° C. for 20 minutes. As a result, the multifilament yarn A' was made into an ultra-fine multifilament yarn with a monofilament fineness of 0.08 dtex (2.9 μm in diameter) and a total fineness of 53 dtex. The tubular fabric was dry-heated at 120° C. Into the tubular fabric, a rod mandrel was inserted and the fabric was heat-set at 170° C. into that shape. Thus, a multi-layer tubular woven construct containing outer layer A with a weft density of 21 picks per 2.54 cm and inner layer B with a weft density of 336 picks per 2.54 cm was obtained.

The multi-layer tubular woven construct was subjected to an evaluation of the permeation rate of the powder dispersion and kink resistance. The results are shown in Table 1. The permeation rate of the powder dispersion was 0.10 mL/(min·cm$^2$·120 mmHg (16 kPa)). The kink resistance value was 50 mm. The multi-layer tubular woven construct had very excellent properties and was found to be suitable as a hose for transportation of a fluid or a powder or as a hose for protection of linear bodies. In actual use, a fluid or a powder will not leak during its transportation, and linear bodies such as a wire will not be caught by the inner layer surface.

Example 6

A polyester monofilament yarn with a monofilament fineness of 180 dtex (0.13 mm in diameter) and a polyester multifilament yarn with a monofilament fineness of 2.33 dtex and a total fineness of 56 dtex were prepared as fibers to form outer layer A of a multi-layer tubular woven construct. The multifilament yarn was used as a warp yarn and the monofilament yarn was used as a weft yarn in the weaving process described later.

A polyester multifilament yarn with a monofilament fineness of 0.58 dtex (7.4 μm in diameter) and a total fineness of 84 dtex was prepared as fibers to form inner layer B. This multifilament yarn was used as warp and weft yarns in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric was heat-set at 170° C. into that shape. Thus a multi-layer tubular woven construct containing outer layer A with a weft density of 21 picks per 2.54 cm and inner layer B with a weft density of 254 picks per 2.54 cm was obtained.

The multi-layer tubular woven construct was subjected to an evaluation of the permeation rate of the powder dispersion and kink resistance. The results are shown in Table 1. The permeation rate of the powder dispersion was 4.50 mL/(min·cm$^2$·120 mmHg (16 kPa)). The kink resistance value was 65 mm. The multi-layer tubular woven construct had excellent properties and was found to be suitable as a hose for transportation of a fluid or a powder or as a hose for protection of linear bodies. In actual use, a fluid or a powder will not substantially leak during its transportation, and linear bodies such as a wire will hardly be caught by the inner layer surface.

Example 7

A polyester monofilament yarn with a monofilament fineness of 22 dtex (0.05 mm in diameter) and a polyester multifilament yarn with a monofilament fineness of 2.33 dtex and a total fineness of 56 dtex were prepared as fibers to form outer layer A of a multi-layer tubular woven construct. The multifilament yarn was used as a warp yarn and the monofilament yarn was used as a weft yarn in the weaving process described later.

A polyester sea-island type multifilament yarn A' with a monofilament fineness of 7.3 dtex and a total fineness of 66 dtex (sea/islands (mass ratio)=20/80, the number of islands: 70) was used as fibers to form inner layer B. The sea component polymer was polyethylene terephthalate copolymerized with sodium 5-sulfoisophthalate, and the island component polymer was polyethylene terephthalate. This multifilament yarn A' was made into an ultra-fine multifilament yarn A in a later process. The multifilament yarn A' was used as warp and weft yarns in the weaving process described below.

A multi-layer tubular woven fabric of 6 mm in outer diameter was woven with a shuttle loom using the above yarns. The tubular fabric was scoured at 98° C. The sea component of the sea-island composite fibers was completely removed by dissolving the sea component in 4% by mass aqueous sodium hydroxide solution at 98° C. for 20 minutes. As a result, the multifilament yarn A' was made into an ultra-fine multifilament yarn with a monofilament fineness of 0.08 dtex (2.9 µm in diameter) and a total fineness of 53 dtex. The tubular fabric was dry-heated at 120° C. Into the tubular fabric, a rod mandrel was inserted and the fabric was heat-set at 170° C. into that shape. Thus, a multi-layer tubular woven construct containing outer layer A with a weft density of 230 picks per 2.54 cm and inner layer B with a weft density of 336 picks per 2.54 cm was obtained.

The multi-layer tubular woven construct was subjected to an evaluation of the permeation rate of the powder dispersion and kink resistance. The results are shown in Table 1. The permeation rate of the powder dispersion was 0.10 mL/(min·cm²·120 mmHg (16 kPa)). The kink resistance value was 75 mm. The multi-layer tubular woven construct had excellent properties and was found to be suitable as a hose for transportation of a fluid or a powder or as a hose for protection of linear bodies. In actual use, a fluid or a powder will not leak during its transportation, and linear bodies such as a wire will hardly be caught by the inner layer surface.

Example 8

A multi-layer tubular woven construct was produced in the same manner as in Example 1 except that an outermost layer C was formed on the outer circumference of outer layer A during the weaving process, with the use of a polyester multifilament yarn with a monofilament fineness of 2.33 dtex (0.47 mm) and a total fineness of 56 dtex as the warp and weft yarns.

The multi-layer tubular woven construct was subjected to an evaluation of the permeation rate of the powder dispersion and kink resistance. The results are shown in Table 1. The permeation rate of the powder dispersion was 0.30 mL/(min·cm²·120 mmHg (16 kPa)). The kink resistance value was 52.5 mm. The multi-layer tubular woven construct had very excellent properties and was found to be suitable as a hose for transportation of a fluid or a powder or as a hose for protection of linear bodies. In actual use, a fluid or a powder will not leak during its transportation, and linear bodies such as a wire will not be caught by the inner layer surface.

Example 9

A polyester monofilament yarn with a monofilament fineness of 180 dtex (0.13 mm in diameter) and a polyester multifilament yarn with a monofilament fineness of 2.33 dtex and a total fineness of 56 dtex were prepared as fibers for forming outer layer A of a multi-layer tubular woven construct. The multifilament yarn was used as a warp yarn and the monofilament yarn was used as a weft yarn in the weaving process described later.

A polyester multifilament yarn with a monofilament fineness of 0.33 dtex (5.6 µm in diameter) and a total fineness of 48 dtex was prepared as fibers for forming inner layer B. This multifilament yarn was used as warp and weft yarns in the weaving process described below.

A multi-layer tubular woven fabric of 45 mm in outer diameter was woven with a shuttle loom using the above yarns. The tubular fabric was scoured at 98° C. The tubular fabric was dry-heated at 120° C. Into the tubular fabric, a rod mandrel was inserted and the fabric was heat-set at 170° C. into that shape. Thus a multi-layer tubular woven construct containing outer layer A with a weft density of 17 picks per 2.54 cm and inner layer B with a weft density of 306 picks per 2.54 cm was obtained.

The multi-layer tubular woven construct was subjected to an evaluation of the permeation rate of the powder dispersion and kink resistance. The results are shown in Table 1. The permeation rate of the powder dispersion was 0.15 mL/(min·cm²·120 mmHg (16 kPa)). The kink resistance value was 70 mm. The multi-layer tubular woven construct had excellent properties and was found to be suitable as a hose for transportation of a fluid or a powder or as a hose for protection of linear bodies. In actual use, a fluid or a powder will not leak during its transportation, and linear bodies such as a wire will hardly be caught by the inner layer surface.

Example 10

A polyester monofilament yarn with a monofilament fineness of 333 dtex (0.18 mm in diameter) and a polyester multifilament yarn with a monofilament fineness of 2.33 dtex and a total fineness of 56 dtex were prepared as fibers to form outer layer A of a multi-layer tubular woven construct. The multifilament yarn was used as a warp yarn and the monofilament yarn was used as a weft yarn in the weaving process described later.

A polyester sea-island type multifilament yarn A' with a monofilament fineness of 7.3 dtex and a total fineness of 66 dtex (sea/islands (mass ratio)=20/80, the number of islands: 70) was used as fibers for forming inner layer B. The sea component polymer was polyethylene terephthalate copolymerized with sodium 5-sulfoisophthalate, and the island component polymer was polyethylene terephthalate. This multifilament yarn A' was made into an ultra-fine multifilament yarn A in a later process. The multifilament yarn A' was used as warp and weft yarns in the weaving process described below.

A multi-layer tubular woven fabric of 1.5 mm in outer diameter was woven with a shuttle loom using the above yarns. The tubular fabric was scoured at 98° C. The sea component of the sea-island composite fibers was completely removed by dissolving the sea component in 4% by mass aqueous sodium hydroxide solution at 98° C. for 20 minutes. As a result, the multifilament yarn A' was made into an ultra-fine multifilament yarn with a monofilament fineness of 0.08 dtex (2.9 µm in diameter) and a total fineness of 53 dtex. The tubular fabric was dry-heated at 120° C. Into the tubular fabric, a rod mandrel was inserted and the fabric heat-set at 170° C. into that shape. Thus, a multi-layer tubular woven construct containing outer layer A with a weft density of 21 picks per 2.54 cm and inner layer B with a weft density of 336 picks per 2.54 cm was obtained.

The multi-layer tubular woven construct was subjected to an evaluation of the permeation rate of the powder dispersion and kink resistance. The results are shown in Table 1. The permeation rate of the powder dispersion was 0.10 mL/(min·cm²·120 mmHg (16 kPa)). The kink resistance value was 5 mm. The multi-layer tubular woven construct had very excellent properties and was found to be suitable as a hose for transportation of a fluid or a powder or as a hose for protection of linear bodies. In actual use, a fluid or a powder will not leak during its transportation, and linear bodies such as a wire will not be caught by the inner layer surface.

Comparative Example 1

A polyester multifilament yarn with a monofilament fineness of 2.33 dtex and a total fineness of 56 dtex was prepared as fibers to form outer layer A of a multi-layer tubular woven construct. The multifilament yarn was used as warp and weft yarns in the weaving process described later.

A polyester multifilament yarn with a monofilament fineness of 0.23 dtex (4.7 μm in diameter) and a total fineness of 33 dtex was prepared as fibers to form inner layer B. This multifilament yarn was used as warp and weft yarns in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric heat-set at 170° C. into that shape. Thus, a multi-layer tubular woven construct containing outer layer A with a weft density of 230 picks per 2.54 cm and inner layer B with a weft density of 230 picks per 2.54 cm was obtained.

The multi-layer tubular woven construct was subjected to an evaluation of the permeation rate of the powder dispersion and kink resistance. The results are shown in Table 1. The construct of this Comparative Example did not contain a monofilament yarn in the weft of the outer layer. The permeation rate of the powder dispersion was 0.30 mL/(min·cm$^2$·120 mmHg (16 kPa)). The kink resistance value was 90 mm. The multi-layer tubular woven construct had poor properties and found to be unsuitable for practical use as a hose for transportation of a fluid or a powder or as a hose for protection of linear bodies. In actual use, although a fluid or a powder will not leak during its transportation, kinking will easily occur and, as a result, clogging with a powder or a fluid will easily occur during its transportation, and linear bodies such as a wire will be easily caught by the inner layer surface.

Comparative Example 2

A polyester monofilament yarn with a monofilament fineness of 15 dtex (0.038 mm in diameter) and a polyester multifilament yarn with a monofilament fineness of 2.33 dtex and a total fineness of 56 dtex were prepared as fibers to form outer layer A of a multi-layer tubular woven construct. The multifilament yarn was used as a warp yarn and the monofilament yarn was used as a weft yarn in the weaving process described later.

A polyester multifilament yarn with a monofilament fineness of 0.23 dtex (4.7 μm in diameter) and a total fineness of 33 dtex was prepared as fibers to form inner layer B. This multifilament yarn was used as warp and weft yarns in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric heat-set at 170° C. into that shape. Thus, a multi-layer tubular woven construct containing outer layer A with a weft density of 350 picks per 2.54 cm and inner layer B with a weft density of 230 picks per 2.54 cm was obtained.

The multi-layer tubular woven construct was subjected to an evaluation of the permeation rate of the powder dispersion and kink resistance. The results are shown in Table 1. In this Comparative Example, the interval between the adjacent threads of the monofilament yarn forming the weft of the outer layer was smaller than the diameter of the monofilament yarn. The permeation rate of the powder dispersion was 0.30 mL/(min·cm$^2$·120 mmHg (16 kPa)). The kink resistance value was 110 mm. The multi-layer tubular woven construct had poor properties and was found to be unsuitable for practical use as a hose for transportation of a fluid or a powder or as a hose for protection of linear bodies. In actual use, although a fluid or a powder will not leak during its transportation, kinking will easily occur and, as a result, clogging with a powder or a fluid will easily occur during its transportation, and linear bodies such as a wire will be easily caught by the inner layer surface.

Comparative Example 3

A multi-layer tubular woven construct was produced in the same manner as in Example 1 except that the multi-layer tubular woven fabric had an outer diameter of 35 mm and that the weft density of outer layer A was set at 130 picks per 2.54 cm.

The multi-layer tubular woven construct was subjected to an evaluation of the permeation rate of the powder dispersion and kink resistance. The results are shown in Table 1. In this Comparative Example, the interval between the adjacent threads of the monofilament yarn forming the weft of the outer layer was smaller than the diameter of the monofilament yarn. The permeation rate of the powder dispersion was 0.30 mL/(min·cm$^2$·120 mmHg (16 kPa)). The kink resistance value was 80 mm. The multi-layer tubular woven construct had poor properties and was found to be unsuitable for practical use as a hose for transportation of a fluid or a powder or as a hose for protection of linear bodies. In actual use, although a fluid or a powder will not leak during its transportation, kinking will easily occur and, as a result, clogging with a powder or a fluid will easily occur during its transportation, and linear bodies such as a wire will be easily caught by the inner layer surface.

Comparative Example 4

A polyester multifilament yarn with a monofilament fineness of 0.33 dtex (5.6 μm in diameter) and a total fineness of 48 dtex was prepared as fibers to form outer layer A of a multi-layer tubular woven construct. The multifilament yarn was used as warp and weft yarns in the weaving process described later.

A polyester monofilament yarn with a monofilament fineness of 180 dtex (0.13 mm in diameter) and a polyester multifilament yarn with a monofilament fineness of 2.33 dtex and a total fineness of 56 dtex were prepared as fibers to form inner layer B. The multifilament yarn was used as a warp yarn and the monofilament yarn was used as a weft yarn in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric heat-set at 170° C. into that shape. Thus, a multi-layer tubular woven construct containing outer layer A with a weft density of 306 picks per 2.54 cm and inner layer B with a weft density of 21 picks per 2.54 cm was obtained.

The multi-layer tubular woven construct was subjected to an evaluation of the permeation rate of the powder dispersion and kink resistance. The results are shown in Table 1. Contrary to our constructs, in this Comparative Example, the monofilament yarn was used in the weft of the inner layer, and the multifilament yarn was used in the warp and weft of the outer layer. The permeation rate of the powder dispersion was 0.15 mL/(min·cm²·120 mmHg (16 kPa)). The kink resistance value was 15 mm. The multi-layer tubular woven construct had poor properties and was found to be unsuitable for practical use as a hose for transportation of a fluid or a powder or as a hose for protection of linear bodies. In actual use, although a fluid or a powder will not leak during its transportation, clogging with the powder or the fluid will easily occur, and linear bodies such as a wire will be easily caught by the inner layer surface.

Comparative Example 5

A polyester monofilament yarn with a monofilament fineness of 180 dtex (0.13 mm in diameter) and a polyester multifilament yarn with a monofilament fineness of 0.33 dtex and a total fineness of 48 dtex (5.6 μm in diameter) were prepared as fibers for forming a single-layer tubular woven construct. In the weaving process described below, the multifilament yarn was used as a warp yarn, and both of the monofilament yarn and the multifilament yarn were used as weft yarns and laid in a manner that 17 picks of the multifilament yarn alternated with 1 pick of the monofilament yarn.

A single-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric heat-set at 170° C. into that shape. Thus, a tubular woven construct containing the monofilament yarn at a weave density of 17 picks per 2.54 cm in the weft and the multifilament yarn with a weave density of 306 picks per 2.54 cm in the weft was obtained.

The tubular woven construct was subjected to an evaluation of the permeation rate of the powder dispersion and kink resistance. The results are shown in Table 1. The tubular woven structure in this Comparative Example had a single layer. The permeation rate of the powder dispersion was 10.00 mL/(min·cm²·120 mmHg (16 kPa)). The kink resistance value was 15 mm. The single-layer tubular woven construct had poor properties and was found to be unsuitable for practical use as a hose for transportation of a fluid or a powder or as a hose for protection of linear bodies. In actual use, a fluid or a powder will leak during its transportation.

Comparative Example 6

A polyester monofilament yarn with a monofilament fineness of 180 dtex (0.13 mm in diameter) and a polyester multifilament yarn with a monofilament fineness of 2.33 dtex and a total fineness of 56 dtex were prepared as fibers to form outer layer A of a multi-layer tubular woven construct. The multifilament yarn was used as a warp yarn and the monofilament yarn was used as a weft yarn in the weaving process described later.

A polyester multifilament yarn with a monofilament fineness of 0.23 dtex (4.7 μm in diameter) and a total fineness of 33 dtex was prepared as fibers to form inner layer B. This multifilament yarn was used as warp and weft yarns in the weaving process described below.

A multi-layer tubular woven fabric of 6 mm in outer diameter was woven with a shuttle loom using the above yarns. The tubular fabric was scoured at 98° C. The tubular fabric was dry-heated at 120° C. Into the tubular fabric, a rod mandrel was inserted and the fabric heat-set at 170° C. into that shape. Thus, a multi-layer tubular woven construct containing outer layer A with a weft density of 110 picks per 2.54 cm and inner layer B with a weft density of 336 picks per 2.54 cm was obtained.

The multi-layer tubular woven construct was subjected to an evaluation of the permeation rate of the powder dispersion and kink resistance. The results are shown in Table 1. In this Comparative Example, the interval between the adjacent threads of the monofilament yarn forming the weft of the outer layer was smaller than the diameter of the monofilament yarn. The permeation rate of the powder dispersion was 0.15 mL/(min·cm²·120 mmHg (16 kPa)). The kink resistance value was 80 mm. The multi-layer tubular woven construct had poor properties and was found to be unsuitable for practical use as a hose for transportation of a fluid or a powder or as a hose for protection of linear bodies. In actual use, although a fluid or a powder will not leak during its transportation, kinking will easily occur and, as a result, clogging with a powder or a fluid will easily occur during its transportation, and linear bodies such as a wire will be easily caught by the inner layer surface.

Comparative Example 7

A polyester multifilament yarn with a monofilament fineness of 2.33 dtex and a total fineness of 56 dtex was prepared as fibers to form outer layer A of a multi-layer tubular woven construct. This multifilament yarn was used as warp and weft yarns in the weaving process described later.

A polyester sea-island type multifilament yarn A' with a monofilament fineness of 7.3 dtex and a total fineness of 66 dtex (sea/islands (mass ratio)=20/80, the number of islands: 70) was used as fibers to form inner layer B. The sea component polymer was polyethylene terephthalate copolymerized with sodium 5-sulfoisophthalate, and the island component polymer was polyethylene terephthalate. This multifilament yarn A' was made into an ultra-fine multifilament yarn A in a later process. The multifilament yarn A' was used as warp and weft yarns in the weaving process described below.

A multi-layer tubular woven fabric of 6 mm in outer diameter was woven with a shuttle loom using the above yarns. The tubular fabric was scoured at 98° C. The sea component of the sea-island composite fibers was completely removed by dissolving the sea component in 4% by mass aqueous sodium hydroxide solution at 98° C. for 20 minutes. As a result, the multifilament yarn A' was made into an ultra-fine multifilament yarn with a monofilament fineness of 0.08 dtex (2.9 μm in diameter) and a total fineness of 53 dtex. The fabric was dry-heated at 120° C. A rod mandrel was inserted into the fabric. A sheath-core type monofilament yarn C' with a monofilament fineness of 240 dtex (0.15 mm in diameter) (core/sheath (mass ratio)=75/25) was prepared using polyethylene terephthalate with a softening point of 110° C. as a sheath component polymer and polyethylene terephthalate as a core component polymer. The sheath-core type monofilament yarn C' was spirally wound around the circumference of the multi-layer tubular woven construct 21 times per 2.54 cm so that the adjacent threads of the monofilament yarn were laid at equal intervals. The tubular woven construct was heat-set at 170° C. to form the rod shape and allow the melt-bonding of the monofilament yarn C' to the tubular woven construct. Thus, a multi-layer tubular woven construct containing outer layer A with a weft density of 21 picks per 2.54 cm and inner layer B with a weft density of 336 picks per 2.54 cm was obtained.

The multi-layer tubular woven construct was subjected to an evaluation of the permeation rate of the powder dispersion and kink resistance. The results are shown in Table 1. The permeation rate of the powder dispersion was 0.10 mL/(min·cm²·120 mmHg (16 kPa)). The kink resistance value was 50 mm. The multi-layer tubular woven construct had poor properties and was found to be unsuitable for practical use as a hose for transportation of a fluid or a powder or as a hose for protection of linear bodies. In actual use, although a fluid or a powder will not leak during its transportation and linear bodies such as a wire will hardly be caught by the inner layer surface, the monofilament yarn C' may peel off from the melt-bonded part when kinking occurs, and the peeling may deteriorate the kink resistance.

weft yarn extending spirally and circumferentially around the tubular woven construct to form the weft, the weft comprising threads lying adjacent to each other, the adjacent weft threads of the monofilament yarn having intervals larger than the diameter of the monofilament yarn.

2. The multi-layer tubular woven construct of claim 1, comprising layer B that is an inner layer relative to layer A, layer B comprising a multifilament yarn as a weft yarn.

3. The multi-layer tubular woven construct of claim 1, comprising two layers comprising an inner layer formed of a multifilament yarn.

4. The multi-layer tubular woven construct of claim 2, wherein the multifilament yarn comprises monofilaments with a diameter of 6 μm or less.

5. The multi-layer tubular woven construct of claim 3, wherein the multifilament yarn comprises monofilaments with a diameter of 6 μm or less.

TABLE 1

|  | Inner layer B Diameter of mono-filaments in multi-filament yarn (μm) | Outer layer A Weft density (Dm) (picks/ 2.54 cm) | Inner layer B Weft density (Df) (picks/ 2.54 cm) | Dm × 3 | Outer diameter (Rh) (mm) | Outer layer A Diameter of cross section of mono-filament yarn (Rm) (mm) | Rh/300 | Rh/50 | Outer layer A Interval between adjacent threads of monofilament yarn (mm) | Permeation rate of powder dispersion | Kink resistance (mm) |
|---|---|---|---|---|---|---|---|---|---|---|---|
| Ex. 1 | 4.7 | 76 | 230 | 228 | 6 | 0.11 | 0.020 | 0.120 | 0.22 | 0.30 | 12 |
| Ex. 2 | 4.7 | 46 | 230 | 138 | 6 | 0.18 | 0.020 | 0.120 | 0.37 | 4.80 | 10 |
| Ex. 3 | 5.6 | 17 | 306 | 51 | 6 | 0.13 | 0.020 | 0.120 | 1.36 | 0.15 | 15 |
| Ex. 4 | 4.7 | 21 | 336 | 63 | 6 | 0.10 | 0.020 | 0.120 | 1.11 | 0.15 | 22 |
| Ex. 5 | 2.9 | 21 | 336 | 63 | 6 | 0.13 | 0.020 | 0.120 | 1.08 | 0.10 | 50 |
| Ex. 6 | 7.4 | 21 | 254 | 63 | 6 | 0.13 | 0.020 | 0.120 | 1.08 | 4.50 | 65 |
| Ex. 7 | 2.9 | 230 | 336 | 690 | 6 | 0.05 | 0.020 | 0.120 | 0.06 | 0.10 | 75 |
| Ex. 8 | 4.7 | 76 | 230 | 228 | 6 | 0.11 | 0.020 | 0.120 | 0.22 | 0.30 | 52.5 |
| Ex. 9 | 5.6 | 17 | 306 | 51 | 45 | 0.13 | 0.150 | 0.900 | 1.36 | 0.15 | 70 |
| Ex. 10 | 2.9 | 21 | 336 | 63 | 1.5 | 0.18 | 0.005 | 0.030 | 1.03 | 0.10 | 5 |
| Com. Ex. 1 | 4.7 | 230 | 230 | 690 | 6 | — | 0.020 | 0.120 | — | 0.30 | 90 |
| Com. Ex. 2 | 4.7 | 350 | 230 | 1050 | 6 | 0.038 | 0.020 | 0.120 | 0.035 | 0.30 | 110 |
| Com. Ex. 3 | 4.7 | 130 | 230 | 390 | 35 | 0.11 | 0.117 | 0.700 | 0.085 | 0.30 | 80 |
| Com. Ex. 4 | (130)*¹ | 306 | 21 | 918 | 6 | (0.0056)*² | 0.020 | 0.120 | — | 0.15 | 15 |
| Com. Ex. 5 | (5.6)*³ | (17)*⁴ | (306)*⁵ | 51 | 6 | (0.13)*⁶ | 0.020 | 0.120 | 1.36 | 10.00 | 15 |
| Com. Ex. 6 | 4.7 | 110 | 336 | 330 | 6 | 0.13 | 0.020 | 0.120 | 0.10 | 0.15 | 80 |
| Com. Ex. 7 | 2.9 | (21)*⁷ | 336 | 63 | 6 | (0.15)*⁸ | 0.020 | 0.120 | (1.06)*⁹ | 0.10 | 50 |

Unit of the permeation rate of powder dispersion: mL/(min · 16 kPa · cm²)

Ex.: Example,
Com. Ex.: Comparative Example
In Table 1, *1 to *9 indicate the following:
(1) *¹The diameter of the monofilament yarn used to form the weft of inner layer B.
(2) *²The diameter of the monofilaments in the multifilament yarn used to form outer layer A.
(3) *³The diameter of the monofilaments in the multifilament yarn used to form the weft and the warp of the single-layer woven construct.
(4) *⁴The weave density of the monofilament yarn used as the weft yarn to form the single-layer woven construct.
(5) *⁵The weave density of the multifilament yarn used as the weft yarn to form the single-layer woven construct.
(6) *⁶The diameter of the monofilament yarn used as the weft yarn to form the single-layer woven construct.
(7) *⁷The number of windings of the monofilament yarn that was melt-bonded to the woven construct.
(8) *⁸The diameter of the monofilament yarn before melt-bonding.
(9) *⁹The interval between the adjacent threads of the monofilament yarn was determined as if the monofilament yarn forms the weft of an outer layer, by taking the number of windings (*⁷) as the number of weft threads and taking the diameter of the monofilament yarn before melt-bonding (*⁸) as the diameter of the outer layer-forming monofilament yarn.

INDUSTRIAL APPLICABILITY

The multi-layer tubular woven construct is suitable as a hose for transportation of a fluid or a powder or as a hose for protection of linear bodies such as wires, cables and conduits.

The invention claimed is:

1. A multi-layer tubular woven construct comprising two or more layers comprising an innermost layer and layer A that is a layer other than the innermost layer, layer A comprising a monofilament yarn serving as a weft yarn, the 6. The multi-layer tubular woven construct of claim 2, that satisfies formula: Df ≥3Dm, wherein Dm is weft density of layer A and Df is weft density of layer B.

7. The multi-layer tubular woven construct of claim 1, that satisfies formula: Rm >Rh/300, wherein Rh is an outer diameter of the multi-layer tubular woven construct and Rm is a diameter of a cross section of the monofilament yarn.

8. The multi-layer tubular woven construct of claim 2, that satisfies formula: Rm >Rh/300, wherein Rh is an outer diameter of the multi-layer tubular woven construct and Rm is a diameter of a cross section of the monofilament yarn.

9. The multi-layer tubular woven construct of claim 3, that satisfies formula: $Rm > Rh/300$, wherein Rh is an outer diameter of the multi-layer tubular woven construct and Rm is a diameter of a cross section of the monofilament yarn.

10. The multi-layer tubular woven construct of claim 4, that satisfies formula: $Rm > Rh/300$, wherein Rh is an outer diameter of the multi-layer tubular woven construct and Rm is a diameter of a cross section of the monofilament yarn.

* * * * *